(12) United States Patent
Kimmerly (10) Patent No.: US 7,831,956 B2
(45) Date of Patent: Nov. 9, 2010

(54) USING ATTRIBUTES TO IDENTIFY AND FILTER PLUGGABLE FUNCTIONALITY

(75) Inventor: Randy S. Kimmerly, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1364 days.

(21) Appl. No.: 11/304,204

(22) Filed: Dec. 14, 2005

(65) Prior Publication Data

US 2007/0061799 A1    Mar. 15, 2007

Related U.S. Application Data

(60) Provisional application No. 60/716,443, filed on Sep. 13, 2005.

(51) Int. Cl.
G06F 9/44 (2006.01)
(52) U.S. Cl. ........................ 717/113; 717/166
(58) Field of Classification Search ................ 717/113, 717/166
See application file for complete search history.

(56) References Cited

U.S. PATENT DOCUMENTS

| | | | |
|---|---|---|---|
| 2,991,398 A | 7/1961 | Strong | |
| 5,062,604 A | 11/1991 | Monnier | |
| 5,148,353 A | 9/1992 | Morgan et al. | |
| 5,219,135 A | 6/1993 | Scott | |
| 5,430,612 A | 7/1995 | Simon et al. | |
| 5,621,618 A | 4/1997 | Komiyama | |
| 5,672,823 A | 9/1997 | Lachmann et al. | |
| 5,873,749 A | 2/1999 | Takiguchi et al. | |
| 6,222,736 B1 | 4/2001 | Sim et al. | |
| 6,227,500 B1 | 5/2001 | Inaba et al. | |
| 6,378,003 B1 | 4/2002 | Danforth | 719/316 |
| 6,389,896 B1 | 5/2002 | Tomita et al. | |
| 6,701,433 B1 | 3/2004 | Schell et al. | 713/164 |
| 6,864,573 B2 | 3/2005 | Robertson et al. | |
| 6,901,595 B2 * | 5/2005 | Mukundan et al. | 719/316 |
| 6,928,639 B2 | 8/2005 | Juan et al. | 717/127 |
| 7,603,657 B2 * | 10/2009 | Gassner et al. | 717/113 |
| 2003/0014466 A1 | 1/2003 | Berger et al. | 709/104 |
| 2003/0074418 A1 * | 4/2003 | Coker | 709/217 |

OTHER PUBLICATIONS

"Notes on the eclipse plug-in architecture," *Bolour Computing*, 2003, http://www.eclipse.org/articles/Article-Plug-in-architecture/plugin_architecture.html, downloaded from the Internet on Mar. 30, 2006, 33 pages.
Jesse Liberty; "Programming C#: Attributes and Reflection" [Online] Jul. 2001; pp. 1-39; XP00250903.
Juval Lowy; "Com and .Net Component Services" [Online] Sep. 20001; XP002509094.

* cited by examiner

*Primary Examiner*—Wei Y Zhen
*Assistant Examiner*—Phillip H Nguyen
(74) *Attorney, Agent, or Firm*—Woodcock Washburn LLP (57) ABSTRACT

In a composition model for large-scale extensible applications, applications are constructed in a modular fashion. The modules integrate with each other by producing and consuming functionality that conforms to a common definition. Producer modules and consumer modules are kept independent of one another, and are linked together indirectly via a definition module. .NET attributes are used to identify various code artifacts (such as classes, methods, properties, etc.) as being functionality definitions, productions, and/or consumptions. These attributes are examined by the module loader and used to create relationships between individually installed producer and consumer modules. The consumer uses .NET attributes to declare dependency on functionality and filter out implementations that don't meet the criteria specified by those attributes.

20 Claims, 6 Drawing Sheets

USING ATTRIBUTES TO IDENTIFY AND FILTER PLUGGABLE FUNCTIONALITY

CROSS-REFERENCE TO RELATED APPLICATIONS

The present application claims the benefit of U.S. Provisional Application No. 60/716,443, filed Sep. 13, 2005, entitled "USING ATTRIBUTES TO IDENTIFY AND FILTER PLUGGABLE FUNCTIONALITY".

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

BACKGROUND

Software for connecting information, people, systems, and devices such as Microsoft .NET (.NET) provides Extensible Markup Language (XML) based interoperability and is currently being incorporated across clients, servers, services, and tools. For example, products like Microsoft Windows® and Microsoft Office® will use .NET to connect with other systems and applications. For software developers, .NET is manifested in the programming model delivered in the Microsoft® .NET Framework. This framework is an integral Microsoft Windows® component that enables building and running the next generation of software applications and World Wide Web (Web) services. It includes technologies for Web services and Web applications, data access, smart client applications and many others.

Web services are invoked over the Internet by means of industry-standard protocols including Simple Object Access Protocol (SOAP), XML, and Universal Description, Discovery, and Integration (UDDI). They are defined through public standards organizations such as the World Wide Web Consortium (W3C). SOAP is an XML-based messaging technology standardized by the W3C, which specifies all the necessary rules for locating Web services, integrating them into applications, and communicating between them. UDDI is a public registry, offered at no cost, where one can publish and inquire about Web services. .NET includes the use of self-describing software modules, semantically encapsulating discrete functionality, wrapped in and accessible via standard Internet communication protocols like XML and SOAP.

Building an extensible client application requires similar modularity, and the ability to detect and utilize functionality without knowing its origin at build time, even though the modules are loaded into the same application process and interact in a strongly-typed fashion. For example, a development environment might have an integration point at which tools that operate on source code (such as compilers, browsers, formatter/beautifiers, etc.) may integrate into the environment. These tools can be authored by third parties, so the environment itself can not be built with the knowledge of which modules they come from. Thus, the environment must disclose the contract via which it interacts with such tools (including the format of the inputs they require and the outputs they produce, etc.), and then discover and load the installed modules that conform to that contract.

The .NET platform certainly has the ability to dynamically load modules into the current process and utilize the functionality inside them, but currently provides no framework for advertising integration points or recognizing valid contributions to those integration points in an application.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, using attributes to identify and filter pluggable functionality is provided. For several embodiments, a system for using attributes to identify and filter pluggable functionality comprises a software consumer module;

a software producer module, and a definition module wherein the producer and consumer modules are indirectly linked to each other through the definition module. The attributes are used to advertise integration points and bodies of code or modules that conform to the integration points that are installed in a software application configuration. In particular, a loader module is provided that is configured to establish the link between the producer module and consumer module, discover modules containing functionality definitions, discover modules that produce functionality that conforms to those functionality definitions, discover modules that consume said functionality, and load the discovered modules.

Other advantages and features of the invention are described below.

BRIEF DESCRIPTION OF THE DRAWINGS

Using attributes to identify and filter pluggable functionality is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
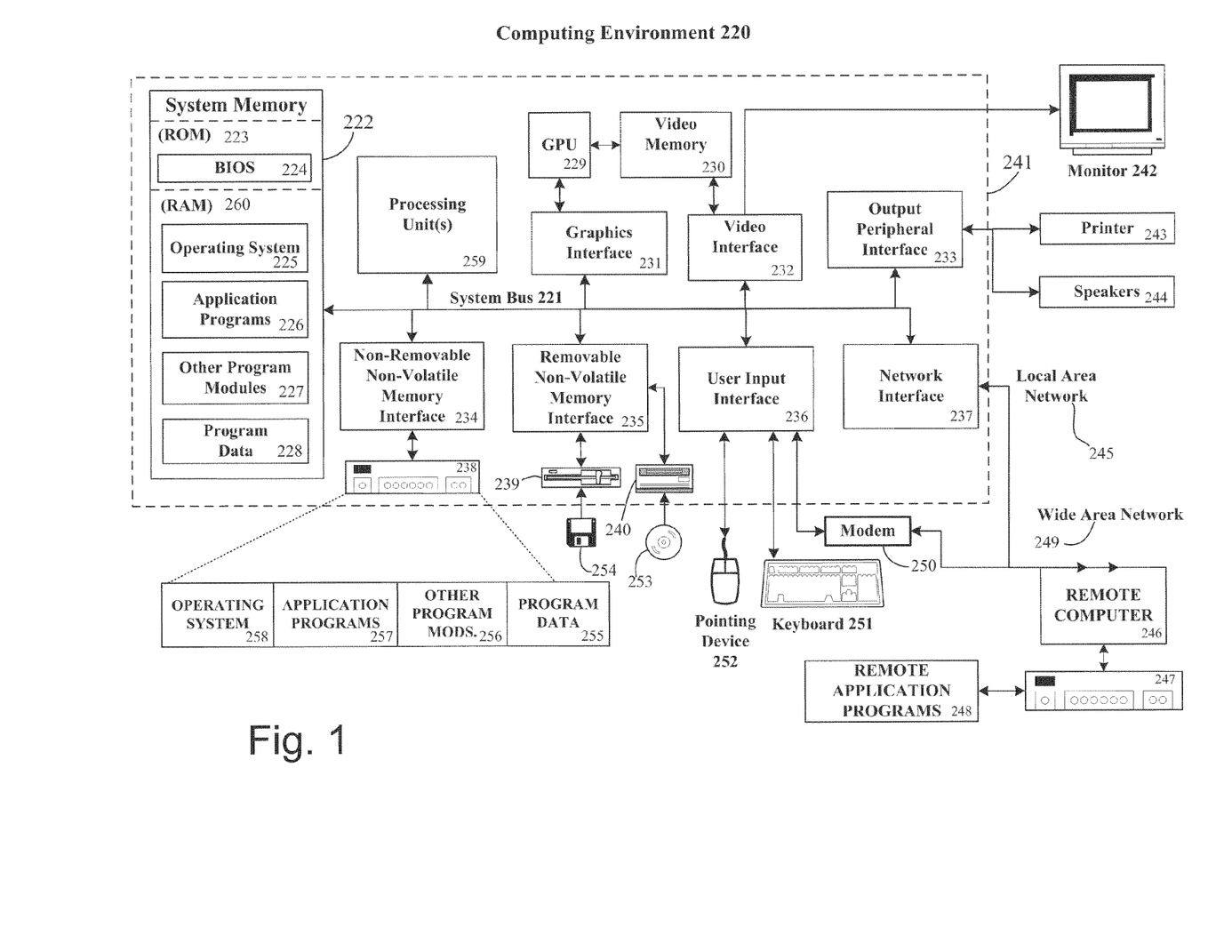
FIG. 1 is a block diagram representing an exemplary computing device suitable for use in conjunction with using attributes to identify and filter pluggable functionality.

Referring to FIG. 1, shown is a block diagram representing an exemplary computing device suitable for use in conjunction with implementing the processes described above. For example, the computer executable instructions that carry out the processes and methods for using attributes to identify and filter pluggable functionality may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

A framework, system and processes are provided and described herein based on the idea of using Microsoft®. NET (.NET) attributes to advertise integration points, and bodies of software code that conform to them. However using Microsoft .NET attributes is provided herein as part of an example embodiment and thus other systems, frameworks and/or platforms that provide attributes in a way similar to that of Microsoft .NET software may be utilized in the same way.

Using .NET attributes to signify the existence of integration points and their contracts, as well as the existence of functionality that conforms to those contracts has the following benefits: Attributes allow for direct association of metadata with executable artifacts (classes, methods, etc.) in a static and serializable fashion. This allows the metadata to be read and cached, enabling the system to subsequently utilize the metadata without loading the module. The benefit here is that the developer of attributed functionality gets to enjoy the convenience of directly associating the metadata with the code artifact, but runtime performance is enhanced by the ability in the system to separate the metadata from the code and load it separately. Being .NET types themselves, attributes are a familiar concept to .NET programmers. Using another method for disclosing integration points and contracts would involve introducing a new mechanism, data format, etc., and add unnecessary and unwanted complexity to the system.

Important is the usage of the same .NET attributes by the consumer to declare dependency on functionality, and filter out implementations that don't meet the criteria specified by those attributes. The contract for any pluggable functionality described by this system consists of both a programmatic interface to the functionality as well as a description of static metadata that accompanies that functionality. That static metadata is expressed in terms of .NET attributes. Consumers can use those attributes in their own code to declare dependency on embodiments of a contract that carry the same attributes, and be matched up with only those embodiments.

Figure 2:
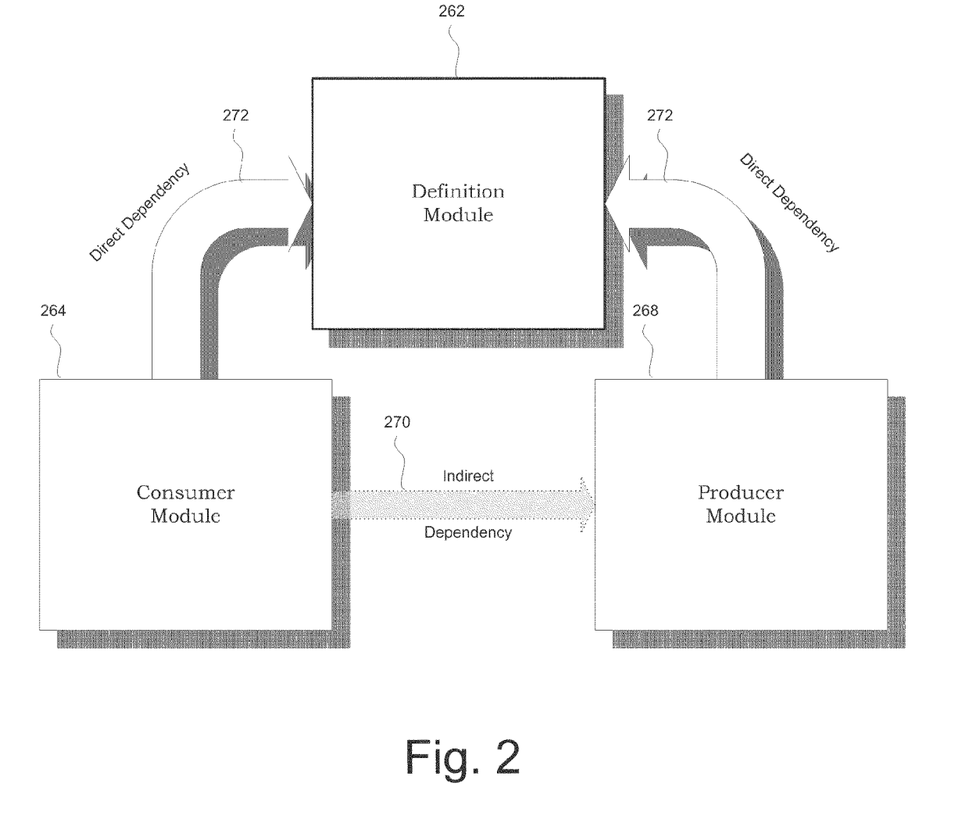
FIG. 2 is a diagram illustrating how in using attributes to identify and filter pluggable functionality software modules integrate with each other by producing and consuming functionality that conforms to a common definition.

Referring next to FIG. 2, shown is a diagram illustrating how in using attributes to identify and filter pluggable functionality, software modules integrate with each other by producing and consuming functionality that conforms to a common definition. The concept is part of a composition model for large-scale extensible applications. In this model, applications are constructed in a modular fashion. The modules 262 264 268 integrate with each other by producing and consuming functionality that conforms to a common definition through direct dependencies 272 on a definition module 262. Producer modules 268 and consumer modules 264 are kept independent of one another, and are linked together indirectly 270 via the definition module 262 as shown in FIG. 2.

The act of establishing the actual link between producer modules and consumer modules is done by the module loader. The loader is responsible for: discovering modules containing functionality definitions, discovering modules that produce functionality that conforms to those definitions, discovering modules that consume such functionality, and loading the modules and establishing the connection between the consumers 264 and corresponding producers 268.

Described below is the mechanism by which the loader performs these tasks. .NET attributes are used to identify various code artifacts (such as classes, methods, properties, etc.) as being functionality definitions, productions, and/or consumptions. These attributes are examined by the module loader and used to create relationships between individually installed producer 268 and consumer 264 modules. Two example implementations are described below.

Figure 3:
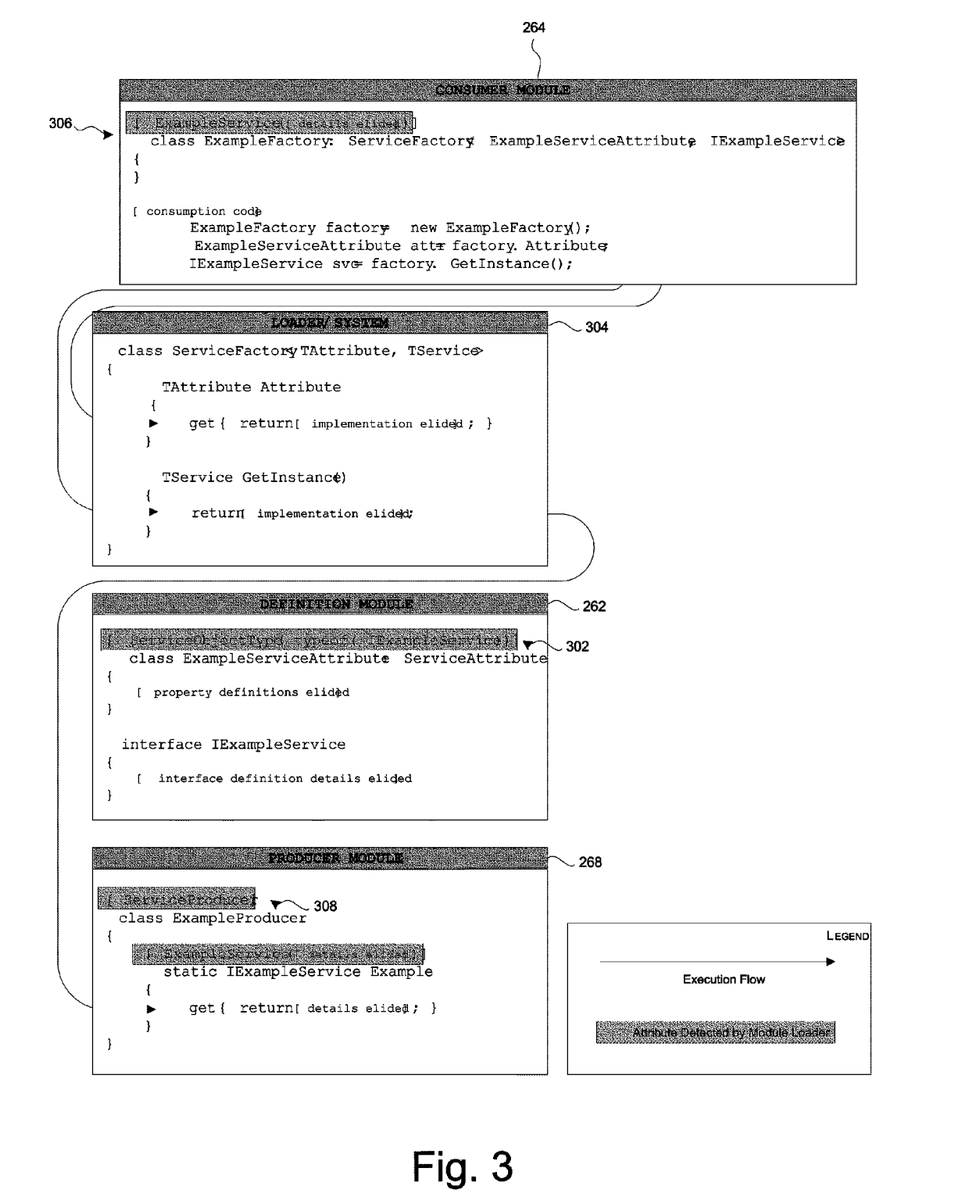
FIG. 3 is a diagram illustrating the execution flow in a first example of an implementation of production/consumption according to software modules that integrate with each other by producing and consuming functionality that conforms to a common definition.

Referring next to FIG. 3, shown is a diagram illustrating the execution flow in a first example of an implementation of production/consumption according to software modules that integrate with each other by producing and consuming functionality that conforms to a common definition. In the first example, a definition of functionality to be produced/consumed comprises a .NET attribute declaration ("service attribute") 302 that derives from a system-supplied base class, identifies a class or interface type ("service object type") via a system-supplied attribute, and has properties that describe static metadata about producers of instances of the service object type.

Service definitions exist in definition modules 262, and are identified by the module loader 304 via reflection, detecting attribute class definitions that meet the above criteria (keyed specifically by the existence of the attribute that identifies the service object type). Producer modules 268 then provide implementations of the service object type ("service objects") via properties which are exposed statically from classes that carry a system-supplied attribute identifying them as "service producer" classes 308, return instances of the service object type, and carry the service attribute, supplying appropriate data for the properties of that attribute that describe this production.

The module loader 304 discovers such properties via reflection, detecting the presence of the service attribute on the property of the service producer class. The service attribute instance that accompanies each such property is made available to consumers of these service objects, and is also used by the module loader 304 for comparison purposes when satisfying dependencies declared by consumers. Consumer modules 264 indicate their desire to use service objects by defining classes ("service factories") 306 that provide access to the service objects. These classes 306 that provide access to the service objects derive from a system-supplied base class which is parameterized by the service attribute type and the service object type and are optionally adorned with the service attribute. The service attribute declares a dependency on producers whose service attribute instances match that supplied with the service factory 306.

The consumer 264 instantiates the service factory 306, which exposes a property that returns the service attribute instance describing the producer 268, as well as a method which invokes the producer's service production property. The implementation of this method is built into the system-supplied base factory class, which uses the module loader's 304 understanding of the installed modules to know which producer module 268 to load and invoke to create the service object. The selection of producer module 268 is determined based on the value of the service attribute instance supplied with the factory. Similarly, the consumer can create a multi-producer factory ("service broker") which behaves exactly like a service factory 306, except that it represents multiple productions of the same service object type.

Figure 4:
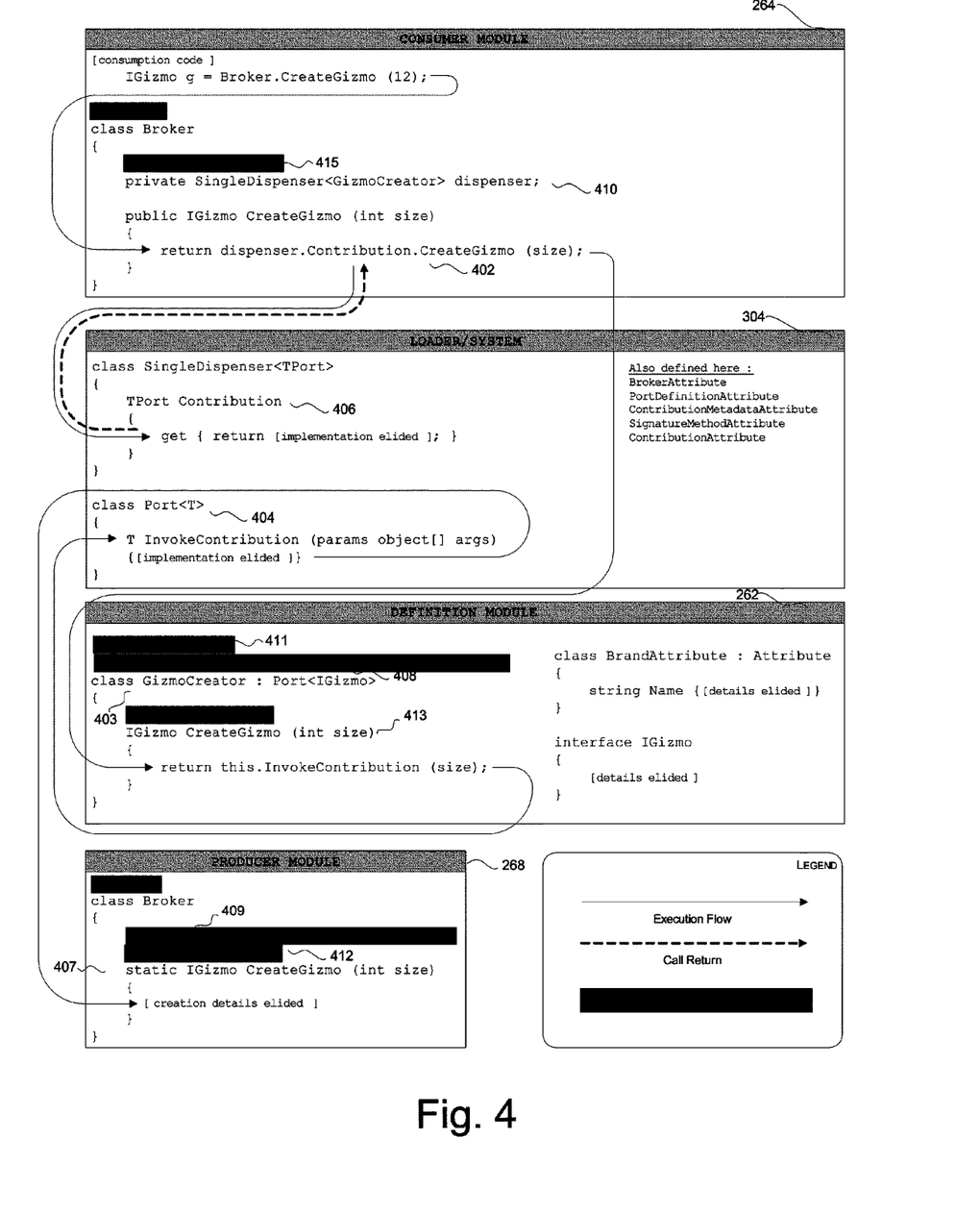
FIG. 4 is a diagram illustrating the execution flow in a second example of an implementation of production/consumption according to software modules that integrate with each other by producing and consuming functionality that conforms to a common definition.

Referring next to FIG. 4, shown is a diagram illustrating the execution flow in a second example of an implementation of production/consumption according to software modules that integrate with either other by producing and consuming functionality that conforms to a common definition. The functionality to be produced/consumed is defined in this second implementation by a class called a "port" 403. Units of functionality that conform to port definitions are called "contributions" 407. A contribution 407 comprises a static method accompanied by metadata 412. That metadata at least contains an identification of the port type which defines the contribution 409. A port 403 is a class definition that: derives from a system-supplied base class 404, is adorned with a system-supplied attribute identifying it as a port definition 411 along with zero or more system-supplied attributes 408 that can be used to associate metadata with corresponding contributions, and contains a method ("signature method") 413. The signature method invokes a contribution method via functionality from the base class, and defines the method signature for contributions defined by this port. A contribution 407 comprises a method that matches the signature method 413 of the port class 403 and metadata 412 associated with that method, declared using the attributes identified 408 by the port class 403.

An instance of a port class 403 represents exactly one contribution 407 conforming to the definition of that port 403. Consumers obtain instances of the port class 403 from the module loader 304 using system-supplied dispenser objects stored in specially attributed fields. The module loader 304 populates these dispenser objects at load time with port instances that match the dependency information declared in the attributes placed on the fields. Consumers can iterate over the port instances from the dispensers, examine the metadata from each contribution, and invoke the contribution method.

FIG. 4 illustrates the execution flow involved in a typical production/consumption using this second example implementation. FIG. 4 shows a "single dispenser" 410 where the number of possible matching contributions is limited to one based on the metadata supplied on the dispenser 410. Specifically, this dispenser 410 calls, as an example, for a "Gizmo-Creator" 402 contribution whose brand name is specified as "X" 412 415. Contributions with other brand names are not represented, and it is a configuration error if more than one contribution with brand name equal to "X" are present.

As described above, the usage of the same .NET attributes by the consumer to declare dependency on functionality, and filter out implementations that don't meet the criteria specified by those attributes, is part of a composition model for large-scale extensible applications. Described below is an example implementation of one such composition model that includes a method of static composition used throughout an architecture to build a system in a modular and extensible fashion. Thus, the concepts of consumer, producer and definition modules as described above are described below in context of the composition model for large-scale extensible applications.

Implementation Example in Context of a Composition Model for Large-Scale Extensible Applications Modularity is well recognized as an important aspect of large system development. Sound design of extensible applications involves not just division of functionality into modules, but also requires a simple, consistent, and open interaction pattern that is tailored to promote pervasive extensibility. The composition model prescribes and enforces such modularity and interaction patterns. The modularity described herein is not about creating boundaries for type isolation or addressing versioning issues. Instead it is a way to create modular, extensible code where one might otherwise build monolithic code. The model is at the level of CLR types interacting via methods and properties within a single app domain. It provides a level of abstraction higher than that of types and it is open, so externally developed modules can extend the system using the same mechanisms that core system modules do.

Described herein are details about how functionality is broken into modules, and what interaction mechanisms exist that allow them to integrate with each other. The goal of the composition model is to define patterns and mechanisms for application development that encourage extensibility, support reuse and maintainability, and exhibit excellent runtime performance.

A core tenet of the composition model is pervasive extensibility. To foster the concept of extensibility from the ground up, the interaction mechanisms must be open and pluggable. All modules have the same ability to extend the system using the same interaction mechanisms, regardless of whether they are core pieces of the application, or are built post-deployment by third party developers.

The composition model modules are reusable without modification in multiple applications. This requires indirection of dependencies on functionality provided by other modules, such that the functionality's definition remains constant, but the implementation may vary between applications.

Maintainable systems have understandable dependency requirements amongst their modules. Related to that, they also have a clear delineation between the publicly consumable portions and the private implementation details. These two aspects together allow developers to understand the impact a change might have across the system.

The performance impact of the model, especially at startup, is extremely small. The design of the interaction mechanisms allow for cheap integration, delaying the more expensive activities such as module loading or other initialization code until the functionality is actually called upon.

To know how a software system works, one needs to recognize its logical pieces and understand the dependencies and interactions between them. In an object oriented system, those pieces are typically objects (or their types). This works well, but doesn't scale up indefinitely. The ability for a developer to comprehend a system at the type level begins to break down quickly once the number of types in that system becomes substantial, such as the size of Visual Studio today. The next generation systems will be even more complex.

In the .NET world, the next level of abstraction is an assembly. Assemblies contain types, but they don't provide a consistent declaration of the relationship between those types, or how they should be used. Often, otherwise unrelated types are combined into assemblies simply to achieve better load performance or distribution convenience. While it is certainly interesting to understand the interdependencies between assemblies in a system, it is usually not enough.

The modularity pattern in the composition model creates a new level of abstraction, one that falls between assemblies and types. Functionality is produced and consumed in units that involve potentially many types, and dependencies amongst modules are explicit in terms of those units. This makes it possible to see not only the existence of, but also the reason for dependencies between assemblies, without going all the way down to the type level.

Extensibility is prevalent in the design of the composition model. This goes well beyond enabling applications to provide "an extensibility model" to end users. The applications themselves are built upon the same extensibility mechanisms that are exposed post-deployment. The motivation is to enhance the productivity of large teams, enabling them to work together more effectively on complex systems by producing and consuming functionality that integrates in a modular fashion.

On top of being modular, a system is open and pluggable from the ground up in order to be truly extensible. The interaction mechanisms and patterns in The composition model are specifically designed for this purpose. The units of functionality shared amongst modules are designed to be open, allowing any number of implementations to exist in an application. This provides the opportunity for any module to plug functionality into an application where it might otherwise be inflexible.

In .NET, there are many possible ways to achieve modularity and describe interactions between modules. The model described here is used consistently throughout the architecture. Such a common mechanism has the benefit of shared implementation, as well as shared understanding amongst all developers of the system.

Being directly tied to other modules limits reusability. It is better to be tied to a module that contains only a public definition of some functionality, whose actual implementation is supplied by a module that is unbeknownst. This way, the module can be used in another application configuration that contains the same public definition of the functionality, but an entirely different implementation that is more suited to that particular application. Such indirection is inherent in the design of this model. Not only does it allow reusability, but it is a key aspect of being open and pluggable such that any module developer can produce functionality that conforms to a public definition, thereby extending the system. It also provides an excellent means of establishing a clear delineation between the publicly consumable API and the private implementation details present in the system.

Each unit of shared functionality in the system can be accompanied by descriptive metadata. This metadata, whose format is part of the functionality's public definition, can be used by consumers to distinguish between the various implementations installed in the application. The system optimizes access to this metadata such that it can be obtained without loading the producing modules, providing rich integration with very little runtime cost.

In .NET, types from different assemblies are bound together via assembly references. At runtime, when a type from another assembly is used, that assembly is located and loaded. Failure to do so will result in an exception being thrown, preventing the consuming code from having to deal with the possibility of that type being unavailable.

Dependency characteristics are similarly available for modules in this model, notwithstanding the indirect nature of the interdependencies. A module author can declare a dependency on implementations of publicly defined functionality that match supplied criteria. If that dependency is not satisfied, the module will not be activated. This avoids the necessity to detect and deal with the situation procedurally.

The composition model provides static, modular composition of large-scale extensible applications. Functionality is reusable in multiple application configurations, and can have only indirect dependencies on other functionality.

A key aspect of the model is the clear separation of definition and implementation of shared functionality. This keeps implementation code free of unwanted dependencies on other specific implementation code, and clearly identifies the public definition, which needs the most attention when the functionality evolves.

Applications built on the composition model platform are modular in design. The modules are, for example, .NET assemblies that interact by producing and consuming functionality through a well-defined mechanism that is ultimately based on the simple act of calling a static method in another module. The primary concept added to that simple act is indirection, permitting the desired functionality to be provided by any assembly, rather than a specific one. As a result of this indirection, it is also possible for multiple implementations of the desired functionality to exist, and consumers can invoke all of them, or choose a subset based on metadata that accompanies each of them.

There are three areas in which this model plays a part in the composition of an application: build, link and runtime. There are certain programming patterns and practices that are used in the model, and verification tools are provided to check and enforce adherence to these rules at build time. The dependencies between modules are indirect, but the composition of the application remains static in this model. As such, there is a linking phase that connects producers and consumers. This phase conceptually occurs immediately before runtime. There is a runtime piece of the system, referred to as the "kernel", which handles loading and activation of assemblies, transfers calls from consumers to the appropriate functionality producers, and provides access to their associated metadata. Once constructed and linked together, though, the application generally executes with very little involvement from the kernel. Interaction points between assemblies are described statically in this model. In the present example, the card shuffling functionality is placed in another assembly (or, perhaps, was provided to the author of Poker.dll in the form of another assembly). The poker assembly can use the shuffling code simply by adding a reference to CardGameUtilities.dll and calling the static method directly. The interaction between assemblies in the composition model is very similar to calling static methods. The key difference is that there is a level of indirection between the producer and the consumer of the desired functionality. One can think of this indirection as an 'interface' which is 'implemented by' the static method, in the same way that a class implements an interface. The caller of the method only knows the shape of the method, but doesn't know or care what assembly it comes from.

Figure 5:
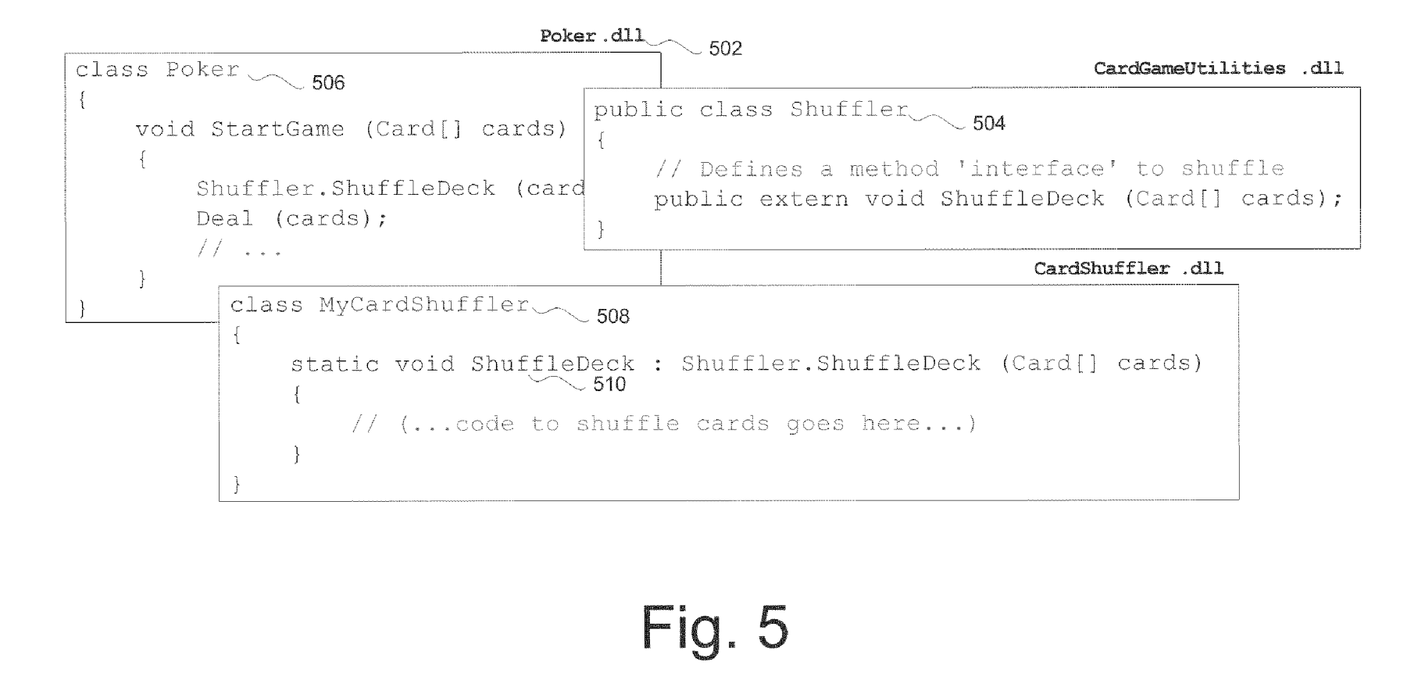
FIG. 5 is a diagram illustrating a level of indirection between the producer and the consumer of the desired functionality according to software modules that integrate with each other by producing and consuming functionality that conforms to a common definition.

Referring next to FIG. 5, shown is a diagram illustrating a level of indirection between the producer and the consumer of the desired functionality according to software modules that integrate with either other by producing and consuming functionality that conforms to a common definition. This indirection is illustrated with the contrived C# syntax of FIG. 5. As shown in FIG. 5, the actual shuffling code exists in an assembly unknown to Poker.dll 502. It "implements" the method "interface" defined in class Shuffler 504, which the caller does know about. The call from the Poker class 506 gets directed to the implementation in the MyCardShuffler class 508. Depending on the application configuration, the call could be directed to a completely different shuffling implementation without modifying the calling assembly.

Note the contrived syntax shown in FIG. 5 should not be taken literally as a proposal for language extensions. The actual mechanisms for achieving this are described in detail later in the document. While it may be interesting to consider language extensions for facilitating these concepts, the "syntax" shown in FIG. 5 is not a proposal for such extensions.

The set of three assemblies 502 504 508 shown in FIG. 5 is representative of a common triad, referred to as definition, producer, and consumer assemblies such as those described above with reference to FIGS. 2 through 4, for example. The terms producer assembly and consumer assembly are generally used only in the context of a single definition, such as the ShuffleDeck method 510 shown in FIG. 5. Usually, a producer assembly for one interaction definition is also a consumer assembly for another. The term implementation assembly is therefore used to refer to such assemblies to differentiate them from definition assemblies.

The indirection between producer and consumer allows another important aspect of the system to emerge. That aspect is the ability for multiple implementations of the desired functionality to be available to consumers. This obviously requires a different calling pattern, which is not illustrated here. Essentially, a consumer would need to iterate over a set of methods and either invoke them all, or pick one (or some) of them based on metadata supplied with them. The latter is a key concept which provides rich, open-ended extensibility capabilities in the system, as well as a mechanism for achieving great performance via delayed loading.

The fundamental pattern involved in assembly interaction in the composition model is a familiar producer/consumer pattern. In all cases there is a level of indirection between the producer and consumer, such that no direct dependency ties exist between them. Multiple consumers, as well as multiple producers, of functionality conforming to the definition are permitted to exist in the system. The functionality produced and consumed in this model is conceptually equivalent to a static method. The system does not prescribe object exchanges of any specific form, over and above the fact that the method may return an object of any type.

Producer assemblies add value to a system in the form of contributions, which are static methods with some accompanying metadata. The shape of the method and metadata is defined by a contribution port (or port). A port is a class that uniquely identifies a point of contact between producers and consumers of functionality. An instance of the port class represents a single contribution defined by that port, and provides access to the metadata, as well as a way to invoke the method of that contribution. Consumers obtain port instances from special objects called dispensers, which are stored in private fields that also carry the consumer's dependency declaration(s) for matching contributions. These fields, as well as the contribution methods, are members of static classes called brokers. Brokers "buy and sell" (consume and produce) contributions that are inter-related, so as to form the singular unit of rejection. Brokers get rejected when they produce contributions that conflict with others, or depend upon contributions that are not available.

A contribution is a static method with some corresponding metadata. Contributions are "produced" and "consumed" by assemblies. To "consume" a contribution is to inspect its metadata and/or invoke its method, while the assembly that contains the contribution is said to "produce" it. Production and consumption of contributions occurs in a statically describable, yet indirect, fashion. This means that an assembly produces a fixed number of contributions which are uniquely identifiable by inspecting the assembly, and the contributions consumed by an assembly are also discoverable based on declared dependency information. However, there are never direct references between an assembly that produces a contribution and those that consume it. These connections are established by the loader.

Contribution methods are private, static methods declared in broker classes. The metadata takes the form of attributes placed on the contribution method. The method is required to match the signature of a specially appointed method in the port class. The types of the attributes that may be used to adorn the contribution method are also identified as part of the port definition.

A contribution port is a class that defines the shape of contributions. One can think of a port as an interface definition that contributions implement. Remember that there is never a direct assembly reference between producers and consumers in this model. A port is the indirection point; both the producer and consumer of a contribution have direct references to the assembly containing the port definition. Part of a port definition is the declaration of a set of attribute types that make up contributions' metadata. These types are identified via attributes placed on the port class definition itself. Also part of the port definition is a public method which serves as the entry point for consumers to invoke contribution methods. This method is called the "signature method" because it defines the signature for contribution methods, again following the interface analogy.

While the port class defines what corresponding contributions must look like, an instance of the port class represents a single such contribution. With a port instance, a consumer has means to inspect the metadata portion of a contribution (via functionality exposed from the base ContributionPort class), as well as means to invoke the contribution method (via the port's signature method).

Note, port instances are sometimes referred to as 'contribution instances' or even just 'contributions'. The context of such references is usually sufficient to differentiate between an instance of the port class, and the production of a contribution (which isn't actually an object).

Implementation assemblies are usually both producers and consumers. The flow of contributions, both "into" and "out of" implementation assemblies, is centralized in a static class called a broker. Contribution methods are actually members of broker classes. There are also objects (called dispensers) stored in static fields of broker classes that represent "incoming" contributions—those contributions consumed by the assembly containing the broker class.

Brokers associate related consumption and production of contributions. For example, a contribution produced by an implementation assembly may be backed by code that consumes another contribution from elsewhere. Should the consumed contributions not be available, the produced contribution should be rejected.

Although somewhat rare, an implementation assembly may contain more than one broker class. In this case, the code in the assembly that is related to one broker must be completely independent from code related to any other broker. Essentially it must be possible to divide the assembly such that there is one broker per assembly, with no assembly references between them. Failing this requirement, the brokers would not survive independent rejection.

Note, in general, development of implementation assemblies will produce a single broker class per assembly. The ability for brokers to be the unit of rejection instead of assemblies allows post-build combination of implementation assemblies, should distribution convenience or load performance scenarios require it.

Port instances can not simply be created by consumers with a new expression. Instead, port instances are provided to consumers by the loader, because they represent contributions that originate from assemblies known only by the loader. Consumers use objects called dispensers to obtain port instances.

Dispensers are objects that are created by consumers using a new expression. They are stored statically in fields of the broker class, and those fields are adorned with attributes that declare the nature of the consumer's dependency on contributions based on the identified port. Those attributes are used to determine which, if any, of the available contributions match the consumer's dependency. The loader populates the dispenser at load time with port instances representing the matching contributions.

The consumer can also indicate a requirement that at least one contribution must be available. If no such contribution is located, the broker is rejected.

There are two forms of dispensers, one which contains a single port instance, and another that contains a collection of them. The single-dispenser is used when the consumer identifies a single contribution (or in situations where a single contribution is all that could possibly be available). A multi-dispenser is used when multiple contributions may be available, and the consumer is prepared to choose among them, or utilize all of them.

Rejection prevents code that depends on missing contributions, or violates system constraints (such as producing conflicting contributions) from being loaded or executed. This allows consumers to confidently use contributions without defensively coding against the possibility of missing dependencies. It also guarantees that the system is composed of a valid set of contributions that are not in conflict with each other.

Rejection occurs during the "link phase" of the application's development lifecycle. This phase conceptually happens before the application starts running, but after the set of candidate assemblies are deployed in a system. The unit of rejection is the broker class, which is a pairing of related consumption and production of contributions. Typically there is a single broker class per implementation assembly, but the granularity of rejection is the broker class to allow implementation assemblies to be merged together if appropriate.

If a broker class is rejected, it is as if it never existed. This means that the contributions it produces will be ignored by the loader, guaranteeing that no consumer will be able to call upon them. This ensures that any code that uses contributions dispensed by that broker class will also never execute. Further, rejection is a cascading event. If a broker is rejected, its productions are effectively non-existent. If another broker declared a dependency on any of those productions, that broker would also be rejected, and so on. This cycle continues until all remaining brokers' requirements are met.

Port definitions must appear in separate assemblies from contributions, providing indirection between producers and consumers. This indirection results in better version resiliency and cleaner modular design by forcing developers to think about the public surface of their components and keeping their implementation details private.

Definition assemblies and implementation assemblies have the following differences. No other assembly may take a dependency on an implementation assembly, making it pointless for implementation assemblies to contain public types. Definition assemblies, on the other hand, are naturally depended upon by other assemblies. Definition assemblies primarily contain public abstract type definitions, while implementation assemblies contain more complex implementation code. Only implementation assemblies can contain contributions. Broker classes in definition assemblies may only contain dispensers.

Programming Model

This section discusses the programming model involved in establishing connections between producers and consumers in the composition model. While not a complete functional specification, these sections will give one a solid understanding of the various classes and attributes, as well as patterns and practices, involved in programming against the model.

The concepts are presented by demonstrating the steps required to define, produce, and consume functionality in a simple example scenario. The example is then enhanced bit by bit to illustrate more capabilities of the programming model.

Example Scenario

To demonstrate the programming model, the following interaction scenario is used. Assume an interface definition exists which is of interest to a consumer assembly. The details of what the interface does is unimportant. This interface is called IGizmo, for example. The consumer assembly is interested in creating instances of these gizmos in an open-ended fashion (meaning it wants to allow instances to come from any assembly, possibly installed as a post-deployment addition to the application).

Given this scenario, it makes sense to define the interaction point between this consumer and the producers as a "gizmo factory". There may be any number of contributions of this "gizmo factory" type, but each one has the same basic behavior, which is to create and return an instance of IGizmo.

The scenario is extended later in the document, but for now, assume that the consumer needs to create one gizmo from each contribution.

Defining a Port

A port is a public class definition, and must be placed in a definition assembly. There is a base class for all port definitions provided by the system, called ContributionPort. It is a generic type, parameterized by the return type of the contribution method.

In addition to deriving from the ContributionPort base class, port definitions must also carry metadata. At a minimum, a port definition must be adorned with the PortDefinition attribute.

The final requirement of a port definition is that it must declare a signature method. The signature method not only defines the signature for corresponding contribution methods, it is the means by which consumers actually invoke them.

The signature method in a port class is identified by carrying the SignatureMethod attribute.

Given these requirements, a port definition for the present example scenario would look like the following:

```
[PortDefinition]
public sealed class GizmoFactory : ContributionPort<IGizmo>
{
    [SignatureMethod]
    public IGizmo CreateGizmo (int size)
    {
        return this.InvokeContribution (size);
    }
}
```

The shape of the signature method is based on what makes sense for this scenario—in this case, for illustration purposes, assume that gizmos have a size parameter that affects their construction. The return type of the signature method must match the type provided to the ContributionPort base class. Note there is an exception to this rule, which is the case where the signature method returns void. In this case, the type supplied to the Port base class should be object. Also, note the body of the signature method. This is the basic form that all signature method implementations will have. The call to the InvokeContribution method (a protected method in the ContributionPort base class) causes the kernel to invoke the contribution method represented by this port instance.

Producing Contributions

Now that the port is defined, how a producer assembly provides a gizmo factory contribution is examined. Contributions are static methods with metadata, and that these methods are members of broker classes. Broker classes belong in implementation assemblies, and are therefore non-public. They are typically defined as static classes (if written in C#) because they are never instantiated and only contain static members. They must also be declared with the Broker attribute, which identifies them as broker classes.

The following code illustrates a broker class which produces a gizmo factory contribution:

```
[Broker]
static class Broker
{
    [Production (typeof (GizmoFactory))]
    private static IGizmo CreateTurboGizmo (int size)
    {
        return new TurboGizmo (size);
    }
}
```

The details around the actual gizmo object instantiated are elided. The important aspects of this example code are that the production attribute identifies CreateTurboGizmo as a contribution method for the GizmoFactory port and that the method is private and static, and has a different name, but otherwise matches the signature method of the port. This is in accordance with the matching rules for contribution methods.

Consuming Contributions

Consumers use contributions by obtaining instances of the port that defines them. Because only the kernel knows the details around the source of the contributions, the kernel is the only place from which the port instances can originate. They are provided to consumers through objects called dispensers, which consumers create and store statically in private fields of their broker class. These fields must carry an attribute (called Consumption) that identifies them as consumptions.

There are two forms of dispensers, one called SingleDispenser and another called MultiDispenser. As their names indicate, they dispense a single port instance, or a set of port instances. The type of port is provided as a type parameter.

In the case of the present scenario, a MultiDispenser is needed because it is desirable to create one gizmo from each available contribution, of which there can be any number. The following broker class contains a dispenser for gizmo factories:

```
[Broker]
static class Broker
{
  [Consumption]
  private static MultiDispenser<GizmoFactory> d = new MultiDispenser<GizmoFactory>( );
  public static IList<GizmoFactory> GizmoFactories
  {
    get
    {
      return d;
    }
  }
}
```

The key here is the field d of type MultiDispenser<GizmoFactory>. This field is recognized (via the Consumption attribute) and populated automatically by the kernel when this broker is loaded. All contributions of type GizmoFactory are represented in the dispenser, each by an instance of GizmoFactory. As a convention, the field is marked private, and there is a corresponding public access property that exposes the collection of port instances to the rest of the code in the assembly. The type of this property is IList< > instead of MultiDispenser< >, simply because consumers of this property don't need or want to know that it is a dispenser they are dealing with; they are content knowing that they have a list of port instances. In fact, MultiDispenser< > does not expose any members other than those required to fulfill the IList< > interface.

With this broker class written, the consumer assembly needs only to write the following code to complete the example scenario:

```
foreach (GizmoFactory f in Broker.GizmoFactories)
  f.CreateGizmo (42);
Execution Flow
```

Figure 6:
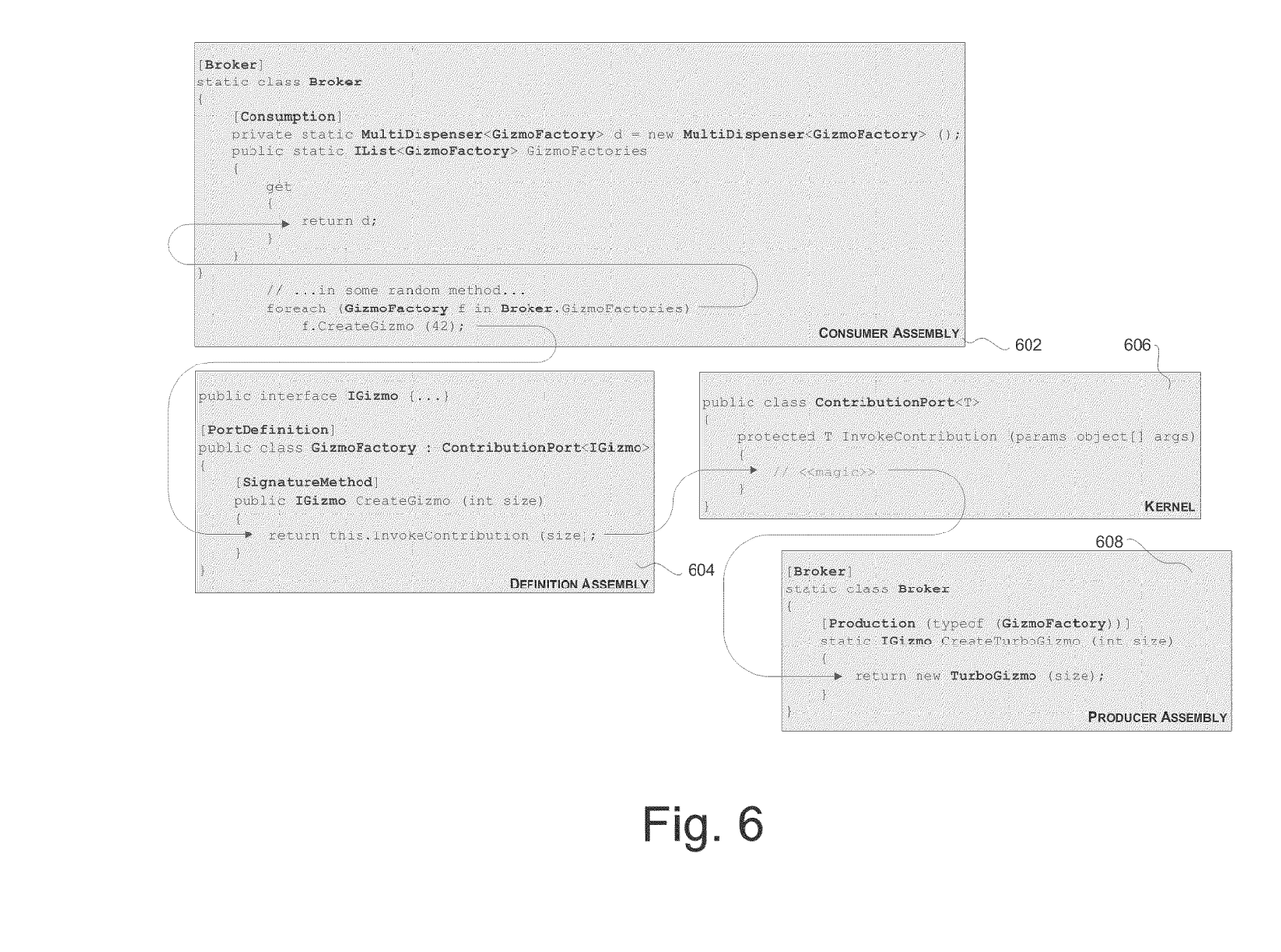
FIG. 6 is a diagram illustrating the execution flow through an example scenario, from the consumer through to a single producer, according to software modules that integrate with each other by producing and consuming functionality that conforms to a common definition.

Referring next to FIG. 6, shown is a diagram illustrating the execution flow through the present scenario, from the consumer through to a single producer. Shown is the flow between the consumer assembly 602, the definitition assembly 604, the kernel 606, and the producer assembly 608.

Adding Metadata

So far, the example scenario has demonstrated how contribution methods are invoked by consumers. However, an application that involves the metadata that can accompany those contributions is provided below. To illustrate that, the example is changed slightly. Gizmo factories are given a brand name, such that all gizmo factories can be distinguished from each other. And the functionality of the consumer is changed to place each gizmo it creates into a table keyed by the brand name of the factory.

The types of attributes that can be used to add metadata to contribution methods must be identified as part of the port definition. This is done using the ContributionMetadataType attribute, which is placed directly on the port class definition.

In the new example scenario, a piece of metadata is identified that is associated with gizmo factory contributions: a brand name. The first step is to define an attribute that represents the brand name, which is straightforward and therefore elided here. Assume the name of this attribute is Brand, it was declared as AllowMultiple=false, and it has a single string property called Name. To associate the attribute with the port, use the ContributionMetadataType attribute like this:

```
[PortDefinition]
[ContributionMetadataType (typeof (BrandAttribute),
IsRequired=true, MustBeUnique=true)]
  public sealed class GizmoFactory : ContributionPort<IGizmo>
  {
    [SignatureMethod]
    public IGizmo CreateGizmo (int size)
    {
      return this.InvokeContribution (size);
    }
  }
```

This attribute permits contributions of type GizmoFactory to be attributed with the Brand attribute. In fact, it requires that contributions be adorned with the Brand attribute, and that the value of that attribute must be unique across all GizmoFactory contributions.

Note that any number of attributes may be associated with a port definition in this way, although each attribute type may only be specified once.

Supplying Metadata with Contributions

Now that the definition of the port has been changed, the contribution needs to be changed as well as shown below:

```
[Broker]
static class Broker
{
  [Production (typeof (GizmoFactory))]
  [Brand (Name = "Acme")]
  private static IGizmo CreateTurboGizmo (int size)
  {
    return new TurboGizmo (size);
  }
}
```

Note, as a result of the progressive disclosure style of writing this example, a breaking, non-backward compatible change to a port definition has been made. In practice, adding a metadata type to a port definition is only considered backward compatible if IsRequired is set to false.

Consuming Metadata

Access to the metadata provided with contributions is provided by the ContributionPort base class in a general way, via a property called Metadata which is of type ContributionMetadata. This is basically a collection of attributes, with generic convenience methods called FindAttribute< > and FindAttributes< > that find and return instances of a specified attribute type.

The following shows how the consumer code from the previous example could be modified to bucket the gizmos created into a dictionary keyed by the brand name of the factory:

```
Dictionary<string, IGizmo> dict = new Dictionary<string, IGizmo> ( );
foreach (GizmoFactory f in Broker.GizmoFactories)
{
   string brandName =
   f.Metadata.FindAttribute<BrandAttribute> ( ).Name;
   dict.Add (brandName, f.CreateGizmo (42));
}
```

Note that it is considered 'safe' to assume that the FindAttribute call will succeed, because the port definition declared that the Brand attribute must accompany all contributions.

Declaring Dependencies

To demonstrate the concept of declaring dependencies on contributions, the example scenario is changes slightly yet again. This time, the requirement that the consumer is given at least one contribution of type GizmoFactory is added. Then this requirement is refined further, stating that the consumer must find at least one with a brand name that matches one in a set of three supplied ones. Finally it is restricted down to a requirement that it be given one contribution with a particular brand name.

Requiring at Least One Contribution

As coded above, the consumer code does not declare any dependency on contributions of type GizmoFactory. The simplest form of dependency declaration is stating a need for at least one contribution. This is done by setting the Required parameter to true on the Consumption attribute, as follows:

```
[Broker]
static class Broker
{
    [Consumption (Required = true)]
    private static MultiDispenser<GizmoFactory> d = new
MultiDispenser<GizmoFactory>( );
    public static IList<GizmoFactory> GizmoFactories
    {
      get
      {
        return d;
      }
    }
}
```

This states that, as a prerequisite for this broker (and any associated code) to be loaded or executed, there must be at least one contribution to be placed in the dispenser. If the installation does not contain such a contribution, the broker is rejected.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, such as that shown in the figure below, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A computer-implemented method for using an attribute to identify a functionality, the method comprising:
   discovering a software consumer module, wherein the software consumer module is configured to consume the functionality;
   discovering a definition module, wherein the definition module is configured to define a programmatic interface for the functionality and an attribute for advertising a functionality definition that corresponds to the functionality, wherein the attribute comprising metadata associated with the functionality;
   discovering a software producer module, wherein the software producer module is configured to produce a functionality implementation that conforms to the functionality definition; and
   establishing a link between the software producer module and the software consumer module for the software consumer module to consume the functionality produced by the software producer module.

2. The method of claim 1 further comprising:
   associating metadata with the definition module, the software producer module, and the software consumer module in a static and serializable fashion.

3. The method of claim 1, wherein the producer module and consumer module are kept independent of one another, and are linked together indirectly via the definition module.

4. The method of claim 1, further comprising obtaining, via the attribute, metadata associated with the software producer module without loading the software producer module.

5. The method of claim 1, wherein the software consumer module is further configured to advertise consumption of the functionality via a service attribute.

6. The method of claim 1, wherein the software consumer module is further configured to define a service factory class for obtaining a method for invoking the functionality provided by the producer module.

7. The method of claim 6, wherein an instance of the service factory class is configured to return a service attribute instance comprising metadata associated with the software producer module.

8. The method of claim 6, wherein the service factory class comprising a service attribute for indicating a producer module criteria, wherein the service attribute declares a dependency on a producer module having an service attribute instance that meets the producer module criteria.

9. The method of claim 1, wherein the software consumer module is further configured to define a service broker class for providing access to a plurality of functionality implementations that provide the functionality.

10. The method of claim 1, wherein the software producer module is further configured to:
define a service producer class for implementing the functionality, the service object type being defined in a definition module;
advertise the service producer class as an functionality implementation via a service attribute; and
supply metadata associated with the service producer class via the service attribute.

11. A system for using an attribute to identify a functionality, the system comprising:
a processor; and
a module loader operated by the processor, and is configured to:
discover a software consumer module, wherein the software consumer module is configured to consume the functionality,
discover a definition module, the definition module is configured to define a programmatic interface for the functionality and an attribute for advertising a functionality definition that corresponds to the functionality, wherein the attribute comprising metadata associated with the functionality,
discover a software producer module configured to produce a functionality implementation that conforms to the functionality definition, and
establish a link between the software producer module and the software consumer module for the software consumer module to consume the functionality produced by the software producer module.

12. The system of claim 11, further comprising the definition module, the definition module comprising:
a port class defining the functionality; and
a port definition attribute advertizing the port class as a port definition.

13. The system of claim 12, wherein the port class further comprising:
a signature method defining a contribution associated with the port class; and
a metadata association attribute for associating metadata with the contribution that corresponds to the port class.

14. The system of claim 11, further comprising the software producer module, the producer module comprising:
a contribution class comprising a static method that corresponds to a signature method of a corresponding port class defined in the definition module; and
a contribution attribute identifying a port type associated with the contribution class.

15. The system of 14, wherein the module loader is configured to provide a plurality of port class instances to the software consumer and wherein the software consumer module is further configured to examine a respective port type of each of the plurality of port class instances, and selecting a port class instance for consuming the functionality based on the respective port type.

16. The system of 11, further comprising the software consumer module, the software consumer module is configured to:
advertise consumption of the functionality via an attribute; and
obtain an port class instance that matches the declared dependency via a dispenser, the port class instance representing a corresponding contribution conforming to the definition of the port class.

17. A computer readable storage medium having computer executable instructions for identifying a functionality, said instructions comprising:
at a consumer module:
declaring dependency on the functionality of a software producer module;
specifying a functionality criterion via an attribute, the attribute comprising metadata associated with the functionality;
receiving a plurality of functionalities via a link to the software producer module, the link being established based on the declared dependency, wherein the link is established by a loader module that discovers the software producer module and the consumer module via a definition module, the definition module defines a programmatic interface for the functionality and the attribute for advertising a functionality definition that corresponds to the functionality; and
consuming one of the plurality of received functionalities produced by the software producer module that meets the specified functionality criterion.

18. The computer readable storage medium of claim 17, the instructions further comprising:
obtaining an port class instance that matches the declared dependency via a dispenser, the port class instance representing a corresponding contribution conforming to the definition of the port class.

19. The computer readable storage medium of claim 17, the instructions further comprising:
obtaining a plurality of port class instance that matches the declared dependency via a dispenser, the plurality of port class instances representing a corresponding contribution conforming to the definition of the port class;
identifying a contribution method based on respective metadata associated with each of the plurality of the port class instances; and
invoking the identified contribution method.

20. A computer readable storage medium having computer executable instructions for identifying a functionality, said instructions comprising:

discovering a software consumer module, wherein the software consumer module is configured to consume the functionality;

discovering a definition module, wherein the definition module is configured to define a programmatic interface for the functionality and an attribute for advertising a functionality definition that corresponds to the functionality, the attribute comprising metadata associated with the functionality;

discovering a software producer module, wherein the software producer module is configured to produce a functionality implementation that conforms to the functionality definition; and establishing a link between the software producer module and the software consumer module for the software consumer module to consume the functionality produced by the software producer module.

* * * * *